A. LINK & J. KOPF.
AUXILIARY DRIVING DEVICE FOR TRANSPORT WAGONS.
APPLICATION FILED NOV. 11, 1912.
1,118,027.
Patented Nov. 24, 1914.
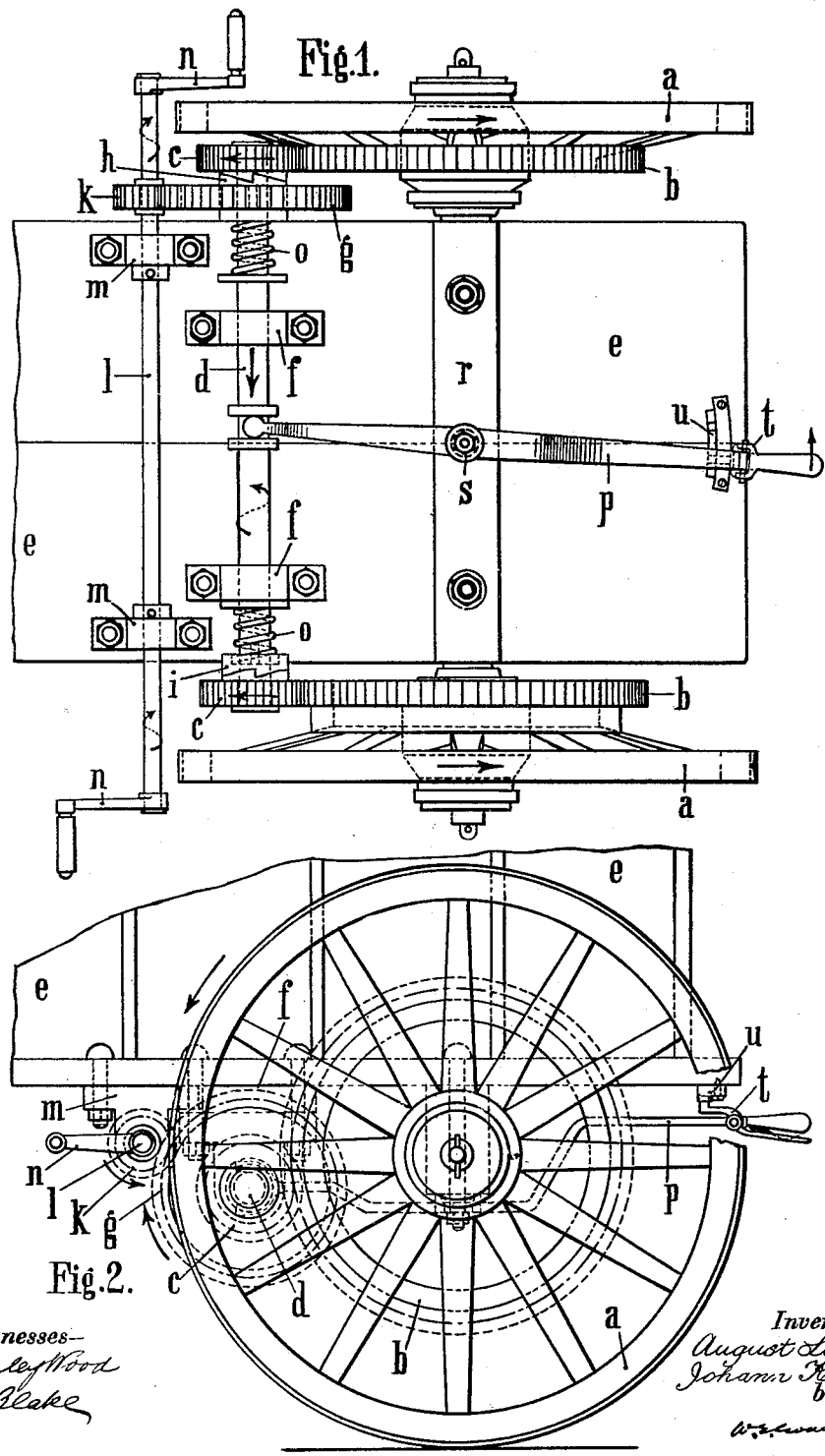
Witnesses—
Stanley Wood
H. N. Blake
Inventors
August Link
Johann Kopf
by
Attorney.

UNITED STATES PATENT OFFICE.

AUGUST LINK AND JOHANN KOPF, OF MANNHEIM, GERMANY.

AUXILIARY DRIVING DEVICE FOR TRANSPORT-WAGONS.

1,118,027.  Specification of Letters Patent.  Patented Nov. 24, 1914.

Application filed November 11, 1912. Serial No. 730,776.

*To all whom it may concern:*

Be it known that we, AUGUST LINK and JOHANN KOPF, subjects of the German Emperor, residing at Mannheim, Baden, Germany, have invented certain new and useful Improvements in Auxiliary Driving Devices for Transport-Wagons, of which the following is a specification.

The object of the invention is to provide a device applicable to transport wagons of all kinds, and also to transportable guns and army wagons, by means of which the draft animals may be assisted manually to effect the forward movement of heavily loaded or heavy wagons on steep roads or on smooth or soft ground or, if necessary, the forward movement may be effected entirely by manual power.

In the drawing is illustrated a construction of the device according to the invention.

Figure 1 shows an underside plan of the rear part of a four-wheeled wagon provided with the auxiliary driving device. Fig. 2 shows the same in side elevation.

On the inner side of each of the two rear wheels $a$ of the wagon there is secured to the wheel spokes (or to the wheel felly) a large toothed flange $b$ with which engages a small toothed wheel $c$. The two toothed wheels $c$ are mounted loosely upon the ends of a common shaft $d$ which is rotatably and slidably mounted in two bearings $f$ secured to the underside of the wagon frame $e$. On this shaft are also mounted, at one end a large toothed wheel $g$, of which the hub forms one part of a clutch coupling $h$, and at the other end one part of a second clutch coupling $i$, neither being rotatable relatively to the shaft, but both being slidable thereon. The hubs of the toothed wheels $c$ form the other parts of the couplings $h$ and $i$. With the wheel $g$ engages a small toothed wheel $k$ which is rigidly mounted upon a second shaft $l$. The latter is also mounted in two bearings $m$, secured to the underside of the wagon frame $e$, and carries at each end a crank $n$. On the shaft $d$ are also mounted two spiral springs $o$ which at one end contact with a fixed collar of the shaft and at the other end with the hub of the wheel $g$ or the movable part of the coupling $i$. Between two collars in the center of the shaft $d$ engages the fork end of a double-armed lever $p$ which is mounted so as to be capable of oscillation on a vertical pivot $s$ provided on the underside of the transverse beam $r$ which carries the axles of the wheels $a$. At the rear end of this lever, which is provided as a handle, is mounted a spring-operated pawl $t$ which engages with one of two notches of a quadrant or segment $u$ secured to the underside of the wagon frame $e$.

If the shaft $l$ is rotated, by means of the cranks $n$ or by means of one of them, in the direction of the arrows, this rotation is transmitted by means of the wheels $k$ and $g$ to the shaft $d$, by means of the couplings $h$ and $i$ to the wheels $c$, and by means of the toothed flanges $b$ to the wagon wheels $a$ in such a manner that the wagon is moved forward.

By the arrangement of the couplings $h$ and $i$ a derangement of the gear, in consequence of the advance of one of the two wagon wheels $a$ relatively to the other, as occurs, for example, when turning corners, is avoided. If one wheel $a$, and with it the toothed wheel $c$ disposed upon the same side, moves faster than the other, the corresponding coupling $h$ or $i$ is automatically put out of operation as the part of the coupling mounted on the wheel $c$, which is moving faster, presses in consequence of the inclination of the coupling teeth the other coupling member inward against the action of the spring $o$ so that the said wheel $c$ is disconnected from the shaft $d$. When traveling on a flat road or on hard ground, where an auxiliary drive is unecessary, the driving device is put entirely out of operation. This is effected by moving the hand lever $p$ in the direction of the arrow, whereby the shaft $d$ with the parts $c$ $g$ $h$ $i$ and $o$ mounted thereon is displaced in such a manner that the wheels $c$ are brought out of engagement with the toothed flanges $b$.

The shaft $d$ can be provided with locking mechanism for the purpose of preventing an unintentional rearward movement of the wagon on an inclined road when the locking mechanism is in operation. For the same purpose the cranks $n$ or one of them can be retarded by hand or by means of a chain secured to the wagon frame.

The action of the auxiliary driving device can be assisted, when traveling on a soft or uneven ground, by clamps in the form of iron cramps which are inserted from the inside upon the wheel fellies so that their ends projecting beyond the wheel tires engage with the ground on the forward movement of the wheels and raise the wheels out of the ground.

Having thus described our invention, what we claim as new and useful, and desire to secure by Letters Patent is:—

In a transport wagon, the combination with the rear wagon wheels; of two large toothed flanges secured to said wheels, a shaft rotatably and slidably mounted on the wagon frame and parallel to the axle of said wheels, two small toothed wheels mounted loosely upon the ends of said shaft and engaging with said toothed flanges, a large toothed wheel slidably but not rotatably mounted upon one end of said shaft, two clutch couplings, one part of each coupling being formed by the hub of the adjacent small toothed wheel, the other part of one coupling being formed by the hub of said large toothed wheel, and the other part of the other coupling being slidably but not rotatably mounted upon the other end of said shaft, springs also mounted upon said shaft and tending to hold the two parts of said couplings in engagement with each other, a second shaft also rotatably mounted on the wagon frame and parallel to the axle of said wagon wheels, a further small toothed wheel rigidly mounted upon the said second shaft and engaging with the said large toothed wheel on the said first shaft, two cranks rigidly mounted upon the ends of the said second shaft, and means for axially displacing said first shaft and bringing said small toothed wheels on the same out of engagement with said toothed flanges.

In testimony whereof we have signed our names to this specification in the presence of two subscribing witnesses.

AUGUST LINK.
JOHANN KOPF.

Witnesses:
AUGUST O. LIEMENS,
ELSE SCHMITT.

Copies of this patent may be obtained for five cents each, by addressing the "Commissioner of Patents, Washington, D. C."